United States Patent
Sakamoto et al.

(10) Patent No.: US 8,081,232 B2
(45) Date of Patent: Dec. 20, 2011

(54) CORRECTING DEFECTIVE PIXELS OF AN IMAGE PICKUP ELEMENT IN AN IMAGE PICKUP APPARATUS

(75) Inventors: Shinya Sakamoto, Tokyo (JP); Yasutada Miura, Tokyo (JP); Hitoshi Ueda, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/818,561

(22) Filed: Jun. 18, 2010

(65) Prior Publication Data

US 2010/0253814 A1    Oct. 7, 2010

Related U.S. Application Data

(62) Division of application No. 11/483,327, filed on Jul. 7, 2006, now abandoned.

(30) Foreign Application Priority Data

Jul. 12, 2005    (JP) .................................. 2005-202564

(51) Int. Cl.
*H04N 5/228* (2006.01)
*H04N 5/217* (2011.01)
(52) U.S. Cl. ...................................... 348/222.1; 348/246
(58) Field of Classification Search ................... 348/246, 348/222.1
See application file for complete search history.

(56) References Cited

U.S. PATENT DOCUMENTS

| 4,748,507 A * | 5/1988 | Gural | 348/219.1 |
| 7,120,315 B2 * | 10/2006 | Barkan | 382/294 |

FOREIGN PATENT DOCUMENTS

| JP | 4-170169 | 6/1992 |
| JP | 2001-86411 | 3/2001 |

* cited by examiner

*Primary Examiner* — Jason Chan
*Assistant Examiner* — Joel Fosselman
(74) *Attorney, Agent, or Firm* — John C. Pokotylo; Straub & Pokotylo

(57) ABSTRACT

An image pickup apparatus includes: an image pickup element having a plurality of pixels; a drive unit moving the image pickup element; a defective position storage unit storing position data on the image pickup element about a defective pixel contained in the plurality of pixels; an image extraction unit extracting a moving picture regeneration area depending on the position of the image pickup element during capturing an image from a captured image obtained by the image pickup element; and a defect correction unit complementing a defective pixel of a captured image obtained by the image pickup element using image data of captured image obtained by the image pickup element in another position. Moving pictures are formed by continuously outputting captured images in the moving picture regeneration area for which the defect correction unit has complemented the defective pixel.

3 Claims, 13 Drawing Sheets

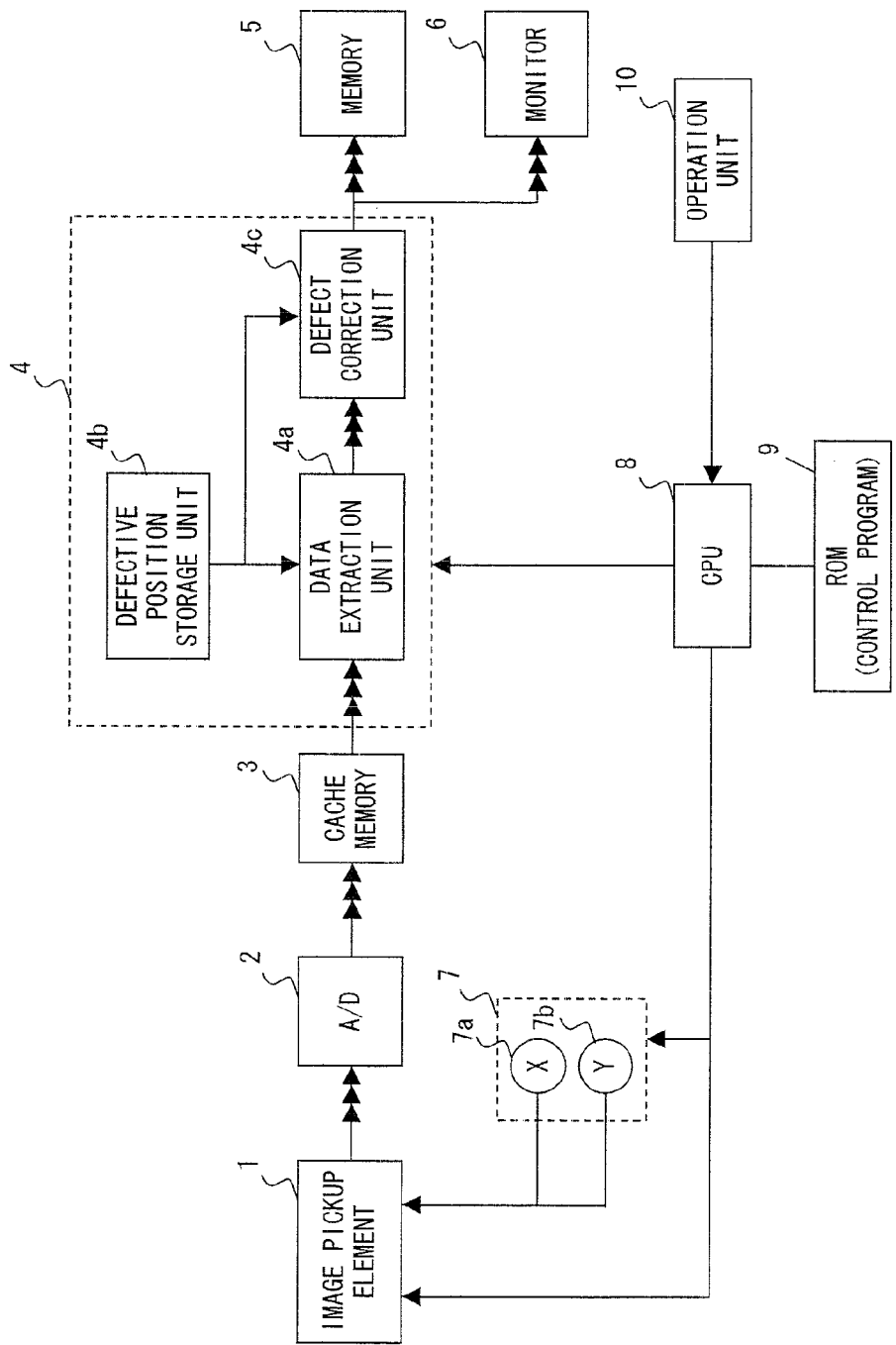
F I G. 1

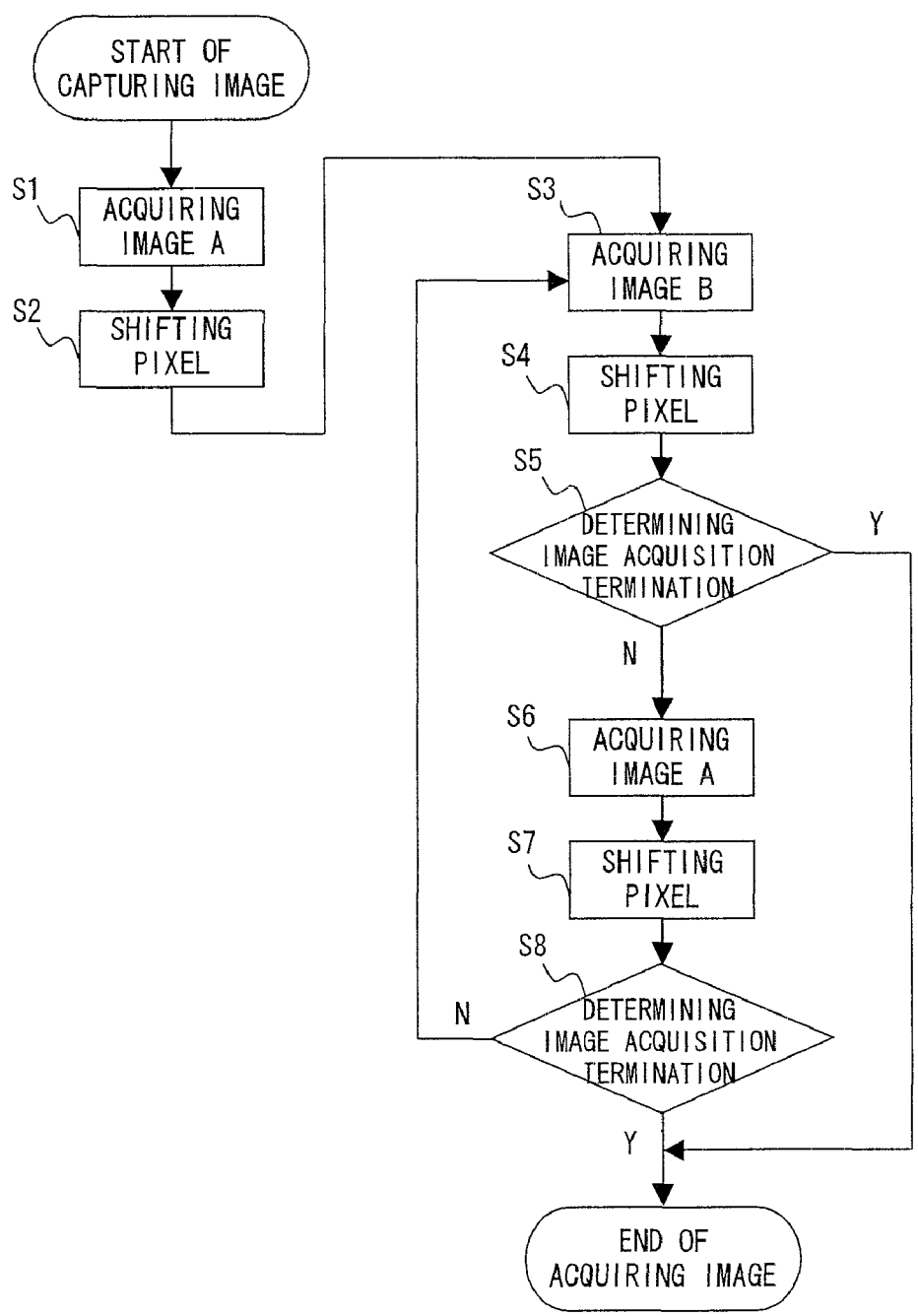
F I G. 5

CORRECTING DEFECTIVE PIXELS OF AN IMAGE PICKUP ELEMENT IN AN IMAGE PICKUP APPARATUS

CROSS REFERENCE TO RELATED APPLICATIONS

This application is a divisional of U.S. patent application Ser. No. 11/483,327 (referred to as "the '327 application" and incorporated herein by reference), filed on Jul. 7, 2006 now abandoned, titled "IMAGE PICKUP APPARATUS CORRECTING FOR DEFECTIVE PIXELS OF AN IMAGE PICKUP ELEMENT" (as amended on Sep. 3, 2009) and listing Shinya SAKAMOTO, Yasutada MIURA and Hitoshi UEDA, as the inventors, which is based upon and claims the benefit of priority from the prior Japanese Patent Application No. 2005-202564, filed Jul. 12, 2005. The entire contents of the '327 application and the foregoing Japanese patent application are incorporated herein by reference.

BACKGROUND OF THE INVENTION

1. Field of the Invention

The present invention relates to an image pickup apparatus capable of recording moving pictures such as a digital camera, a digital video camera, etc.

2. Description of the Related Art

Recently, an image pickup element including photoreception elements in a matrix form is used for recording moving pictures. Each photoreception element is called a pixel, and each pixel can independently receive an optical signal. Therefore, by leading a reflected light from a target to an image pickup element, an optical signal corresponding to a target is obtained from each pixel, and converted into and formed as image information. The moving pictures are formed by continuously fetching the image information at predetermined time intervals and joining a preceding image to a subsequent image. Therefore, it is desired to obtain moving pictures which have a high frame rate and can correctly regenerate the motion of a target.

The Japanese Patent Application Laid-open No. 2003-156565 describes a method of acquiring again an image at a defective position using normal pixels around a defective pixel by moving the image pickup element and twice capturing an image, thereby complementing a signal.

SUMMARY OF THE INVENTION

The image pickup apparatus according to an aspect of the present invention includes: an image pickup element having a plurality of pixels; a drive unit for moving the image pickup element; a defective position storage unit storing position data on the image pickup element about a defective pixel contained in the plurality of pixels; an image extraction unit for extracting a moving picture regeneration area depending on the position of the image pickup element during capturing an image from a captured image obtained by the image pickup element; and a defect correction unit for complementing a defective pixel of a captured image obtained by the image pickup element using image data of captured image obtained by the image pickup element in another position With the configuration, moving pictures are formed by continuously outputting captured images in the moving picture regeneration area for which the defect correction unit complemented the defective pixel.

BRIEF DESCRIPTION OF THE DRAWINGS

FIG. 1 is a block diagram of the basic configuration of the image pickup apparatus according to an embodiment 1;

FIG. 5 is a flowchart of the image acquiring process performed during shooting moving pictures by the image pickup apparatus according to the embodiment 1;

DESCRIPTION OF THE PREFERRED EMBODIMENT

The embodiments of the present invention are explained below by referring to the attached drawings.

Embodiment 1

FIGS. 1 to 6 are explanatory views of the present embodiment.

Figure 2:
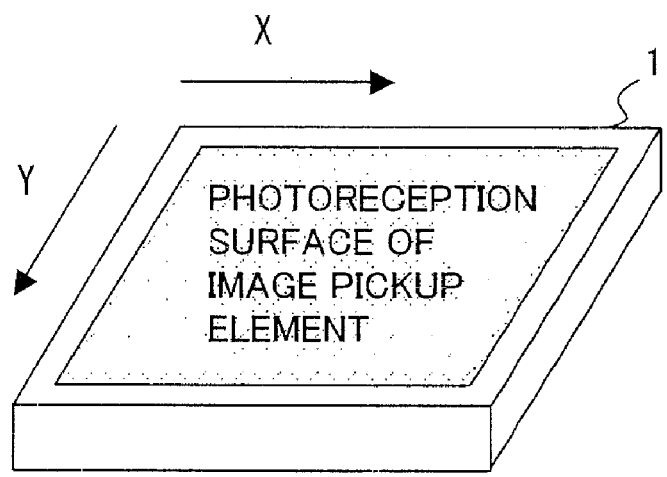
FIG. 2 shows x-axis and y-axis of the coordinates system used when each pixel position of an image pickup element is expressed.
Figure 3:
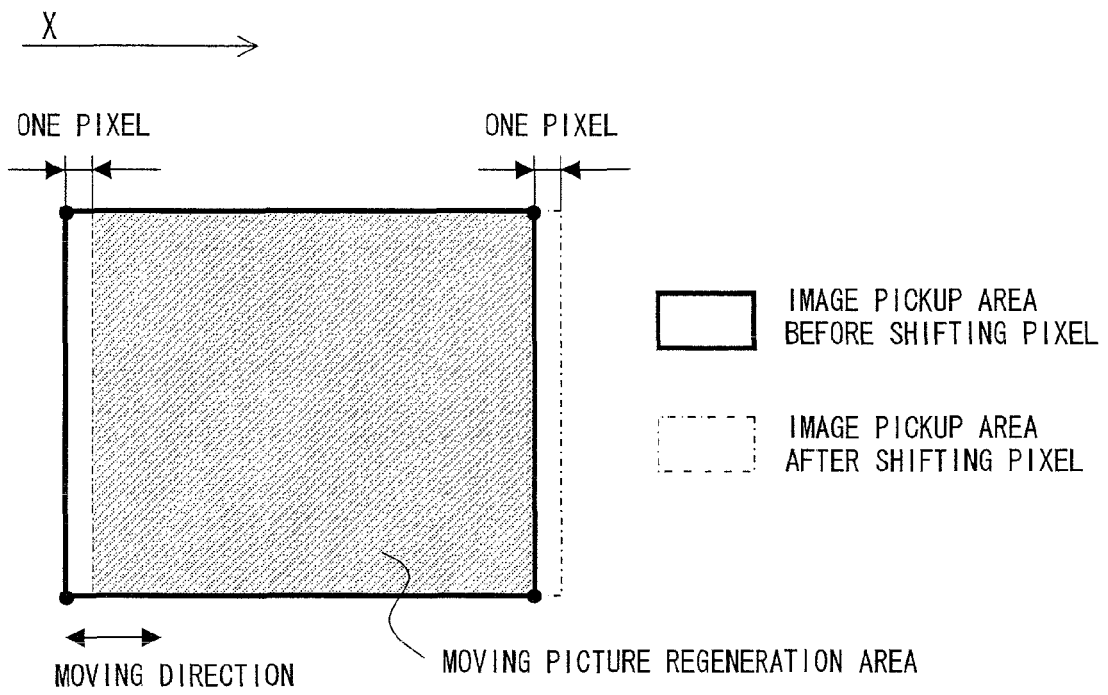
FIG. 3 shows an image pickup area and a moving picture regeneration area when an image pickup element is moved.
Figure 4:
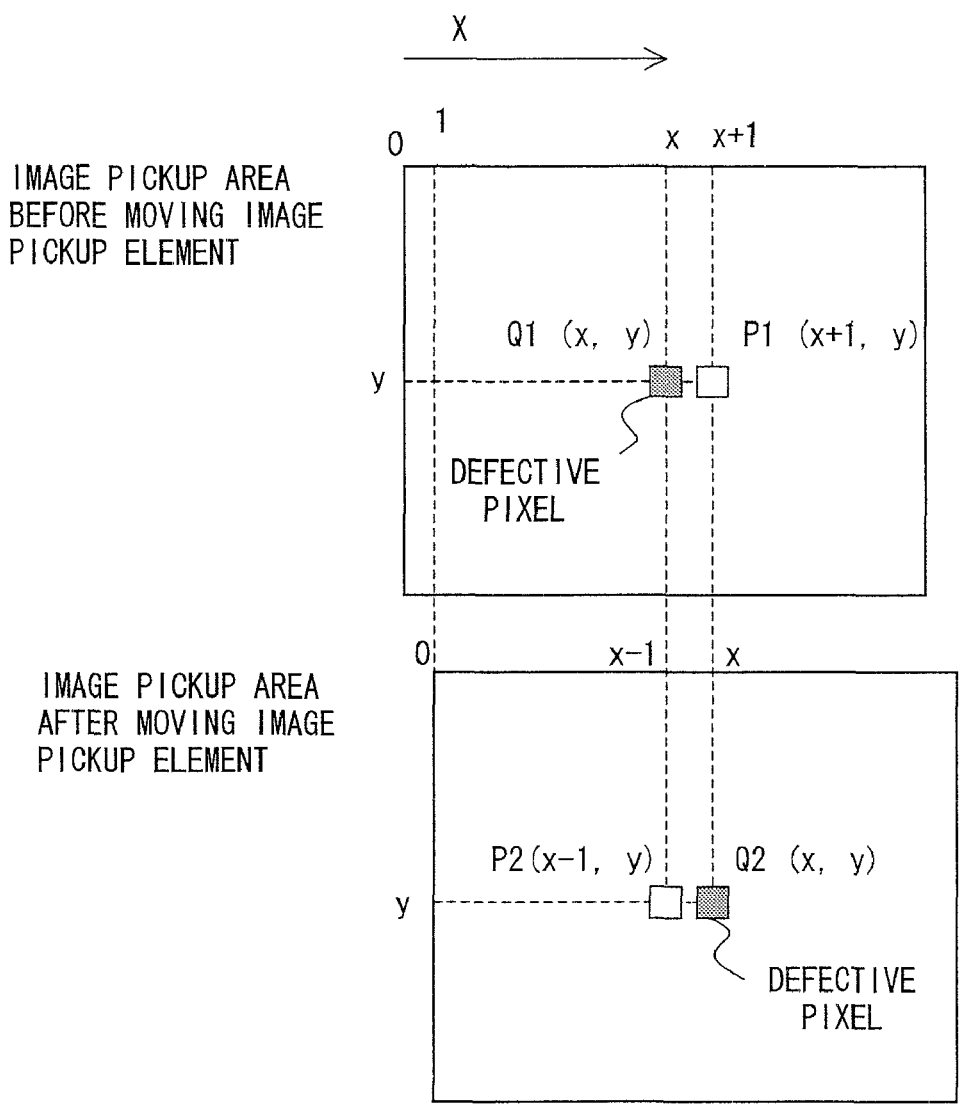
FIG. 4 shows the position of a defective pixel when an image pickup element is moved in the embodiment 1.
Figure 6:
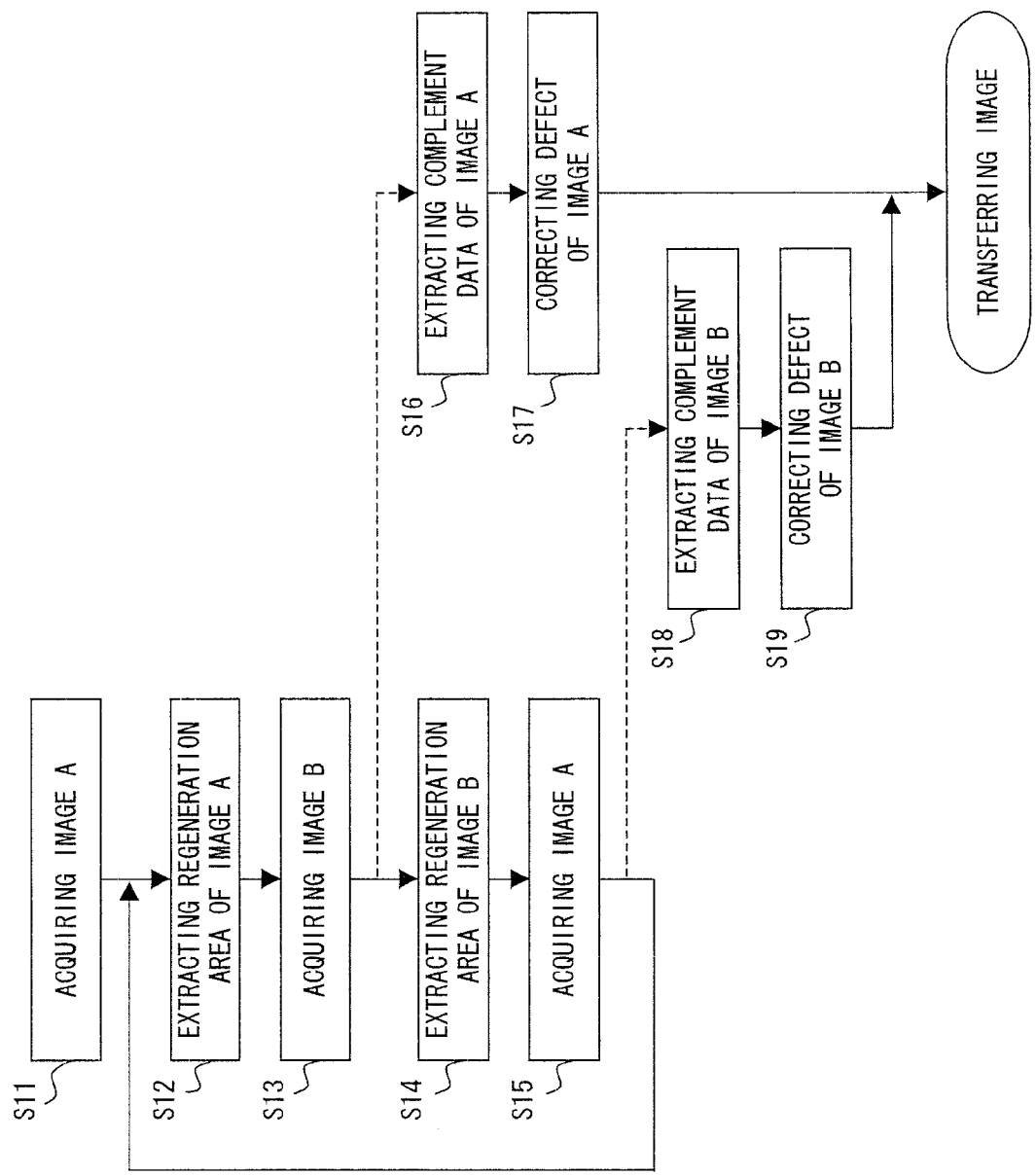
FIG. 6 is a flowchart of the image processing performed during shooting moving pictures by the image pickup apparatus according to the embodiment 1.

FIG. 1 is a block diagram of the basic configuration of the image pickup apparatus according to the present embodiment. FIG. 2 shows x-axis and y-axis of the coordinates system used when each pixel position of an image pickup element is expressed. FIG. 3 shows an image pickup area and a moving picture regeneration area when an image pickup element is moved. FIG. 4 shows the position of a defective pixel when an image pickup element is moved. FIG. 5 is a flowchart of the image acquiring process performed during shooting moving pictures by the image pickup apparatus according to the present embodiment. FIG. 6 is a flowchart of the image processing performed during shooting moving pictures by the image pickup apparatus.

First, the central configuration of the image pickup apparatus according to the present embodiment is explained below by referring to FIG. 1.

In FIG. 1, an image pickup element 1 is formed by a plurality of pixels. An A/D converter 2 converts an analog image signal obtained by the image pickup element 1 into a digital image signal (digitized image data). Cache memory 3 temporarily accumulates digitized image data. A signal processing unit 4 performs various image processes. Memory 5 stores completed image data (for example, moving pictures data). A monitor 6 outputs image data (for example, moving pictures data).

The signal processing unit 4 includes a data extraction unit 4a, a defective position storage unit 4b, and a defect correction unit 4c. The defective position storage unit 4b stores in advance the position data of the defect of a pixel in the image pickup element 1 obtained at the shipment from the factory or during the calibration of a camera. The data extraction unit 4a serially reads image data stored in the cache memory 3, extracts the image data in the moving picture regeneration area, and extracts the image data at a specific position specified by the defective position storage unit 4b as a defect correction value (complement data). The defect correction unit 4c complements the image data of a defective pixel in the image data in the moving picture regeneration area using a defect correction value based on the position data of the defect of a pixel stored in the defective position storage unit 4b, and the image data in the moving picture regeneration area and the defect correction value extracted by the data extraction unit 4a, thereby correcting the image data in the moving picture regeneration area. The corrected image data obtained from the defect correction unit 4c is stored in the memory 5. The corrected image data can also be output by the monitor 6.

An image pickup element drive unit 7 includes an actuator 7a capable of moving the image pickup element 1 in the direction along the x-axis (hereinafter referred to as an "X direction"), and an actuator 7b capable of moving the image pickup element 1 in the direction along the y-axis (hereinafter referred to as an "Y direction"). The x-axis and the y-axis are indicated as arrows in FIG. 2.

A CPU 8 integrally controls the image pickup element drive unit 7, the image pickup element 1, and the signal processing unit 4 by reading and executing a control program stored in ROM 9, and controls the entire operation of the image pickup apparatus.

An operation unit 10 can be operated by a user when an image acquiring process is performed, and can transmit the timing of starting and terminating the acquisition of a desired image.

Explained below is the operation performed by the image pickup apparatus with the above-mentioned configuration while shooting moving pictures.

In the apparatus, the image pickup element 1 moves between the normal position and the predetermined position alternately during shooting moving pictures, and obtaining an image by the image pickup element 1 in the normal position and obtaining an image by the image pickup element 1 in the predetermined position are repeated alternately. In this embodiment, the predetermined position is explained as the position obtained by moving the image pickup element 1 one pixel in the +X direction from the normal position.

First, by referring to FIGS. 3 and 4, the details of obtaining an image are explained below.

In FIG. 3, the area encompassed by the solid lines indicates an image pickup area of an image pickup element before moving the image pickup element ("before shifting the pixel"), and the area encompassed by the dotted lines indicates an image pickup area on the image pickup element after moving the image pickup element ("after shifting the pixel"). In FIG. 3, the position of the image pickup element before moving the image pickup element is defined as a normal position, and the position of the image pickup element after moving the image pickup element is defined as above predetermined position. Thus, since the image pickup areas of a target are naturally different between before and after moving the image pickup element 1, the overlaps (indicated by the diagonal lines in FIG. 3) in the image pickup area before and after moving the image pickup element 1 are defined as a moving picture regeneration area.

FIG. 4 shows up and down the image pickup areas on the image pickup element before and after moving the image pickup element 1 with the position in the X direction associated with each other. As shown in FIG. 4, by moving the image pickup element 1, the defective pixel Q1 positioned at the coordinates (x, y) on the image pickup element before moving the image pickup element is moved to the defective pixel Q2 positioned at the coordinates (x, y) on the image pickup element after moving the image pickup element. Thus, the relative positions of the defective pixel on the image pickup element are not different before and after the movement of the image pickup element 1, but the absolute position of the specific portion of the target is moved. Based on the positional relationship, the image data of the target to be obtained by the defective pixel Q1 can be obtained by the pixel P2 (x−1, y) on the image pickup element after the movement, and the image data of the target to be obtained by the defective pixel Q2 can be obtained by the pixel P1 (x+1, y) on the image pickup element before the movement.

In this operation, an undesired influence of a defective pixel on an image can be eliminated by complementing, in two images before and after a movement, the image data of a defective pixel in an image using the image data of a corresponding pixel of another image.

Using the flowchart in FIGS. 5 and 6, the operation during shooting moving pictures is explained below in detail. In this explanation, just for convenience, an image obtained in the image pickup area of the image pickup element 1 in a normal position is defined as an image A, and an image obtained in the image pickup area of the image pickup element 1 in a predetermined position (position of one pixel movement in the +X direction) is defined as an image B.

First, by referring to FIG. 5, the image acquiring process performed during the operation is explained below in detail.

As shown in FIG. 5, when the shooting process is started in this operation, the CPU 8 transmits a drive timing signal to the image pickup element 1 and the image pickup element drive unit 7, and the image acquisition control is started at the following predetermined frame rate.

First, the image A is acquired, and the acquired image data is stored in the cache memory 3 (step (hereinafter referred to simply as "S") 1). Then, the image pickup element 1 is one pixel moved in the +X direction by the actuator 7a (S2). Thus, the image pickup element 1 moves to the predetermined position.

Then, the actuator 7a acquires the image B, and stores it in the cache memory 3 (S3). Then, the actuator 7a moves the image pickup element 1 one pixel in the −X direction, thereby returning it to the original position (normal position) (S4).

Then, it is determined whether or not the CPU 8 has accepted an image acquisition termination request from the operation unit 10 (S5). If the determination result is YES, it is determined that the acquisition of the image has terminated, thereby terminating the image acquiring process.

If the determination is NO, the acquisition of the image is continued. In S6 and S7, the processes similar to those in S1 and S2. In S8, the process similar to that in S5 is performed. If the determination in S8 is NO, control is returned to S3. If YES, the image acquiring process terminates.

As described above, in the operation, the acquisition of an image by the image pickup element 1 in the normal position and the acquisition of an image by the image pickup element 1 in the predetermined are alternately repeated until an image acquisition termination request is received.

Then, by referring to FIG. 6, the image processing performed in this operation is explained below in detail. As shown in FIG. 6, when the image data of the image A is stored in the cache memory 3 in the process in S1 shown in FIG. 5, the data extraction unit 4a acquires the image data of the image A from the cache memory 3 (S11), and extracts an moving picture regeneration area (refer to FIG. 3) from the image data of the image A (S12).

Then, the data extraction unit 4a acquires from the cache memory 3 the image data of the image B (for example, the image data of the image B stored in the cache memory 3 in the process in S3 shown in FIG. 5) stored in the cache memory 3 after the image data of the image A acquired in S11 (S13), extracts the moving picture regeneration area from the image data of the image B (S14), refers to the position data of the defect of the pixel stored in the defective position storage unit 4b, and extracts the image data of the corresponding pixel (refer to the pixel P2 shown in FIG. 4) of the image B obtained in S13 as the complement data of the defective pixel position (refer to the pixel Q1 shown in FIG. 4) of the image A extracted in S12 (S16). After S16, the defect correction unit 4c complements the image data of the defective pixel of the image A extracted in S12 using the complement data extracted in S16, thereby correcting the defect of the image A (S17). Then, the corrected image A is transferred to the memory 5.

On the other hand, the data extraction unit 4a separately continues the process. After the process in S14, the data extraction unit 4a acquires from the cache memory 3 the image data of the image A stored in the cache memory 3 after the image data of the image B acquired in S13 (S15). Then, it refers to the position data of the pixel defect stored in the defective position storage unit 4b, and extracts the image data of the corresponding pixel (refer to the pixel P1 shown in FIG. 4) of the image A acquired in S15 as the complement data of the defective pixel position (refer to pixel Q2 shown in FIG. 4) of the image B extracted in S14 (S18). After S18, the defect correction unit 4c then corrects the defect of the image B by complementing the image data of the defective pixel of the image B extracted in S14 using the complement data extracted in S18 (S19). The corrected image B is transferred to the memory 5.

On the other hand, the data extraction unit 4a separately continues the process. After the process in S15, control is returned to S12. The above-mentioned process is repeated until there is no image data acquired from the cache memory 3 In S13 or S15. Thus, the corrected images A and B are alternately and continuously transferred to the memory 5, thereby forming moving pictures.

Thus, by performing the image processing, defective pixel Q1 in the image A can be complemented by the normal pixel P2 in the image B, and the defective pixel Q2 in the image B can be complemented using the normal pixel P1 in the image A. Therefore, an image having a very small complement error can be regenerated.

Although an image pickup area is changed by the movement of the image pickup element 1, the same portion can be constantly regenerated by setting a moving picture regeneration area. Therefore, data can be obtained for each frame for the pixel other than a defective pixel, and moving pictures can be shot without reducing the frame rate.

As described above, according to the present embodiment, when moving pictures are shot using an image pickup element having a pixel defect, an image having a very small influence of a pixel defect can be acquired while maintaining appropriate frame rate. Thus, the optimum moving pictures with both appropriate frame rate and image quality maintained can be acquired.

In this embodiment, the image pickup element 1 is moved by one pixel, but it can also be moved by an integral multiple of a pixel.

Furthermore, according to this embodiment, the moving direction of the image pickup element 1 from the normal position to a predetermined position is the +X direction, but the direction can also be any of the 8 directions around the pixel. In this case, the presence/absence of an adjacent defective pixel is checked for a defective pixel detected in advance, and the moving direction can be determined as a direction having no overlap of the adjacent defective pixel or having the smallest overlap can be determined. Thus, the moving direction can be optimized for each image pickup element although a pixel defect can be generated in any pattern. Therefore, the possibility of a remaining pixel defect (possibility that a defective pixel is complemented by a defective pixel) can be minimized. The method of determining the moving direction of an image pickup element is explained in detail by referring to the embodiment 3.

In the present embodiment, the moving direction and the amount of movement of the image pickup element 1 from the normal position to the predetermined position is fixed to one pixel in the +X direction. However, the moving direction and the amount of movement can also be optionally selected by a user.

Embodiment 2

The present embodiment has a further function for higher resolution by shifting a pixel (moving the image pickup element) as compared with the embodiment 1.

When a pixel is shifted, an image can be captured for a portion of a target between pixels. Therefore, by acquiring images before and after shifting a pixel and composing an image, an image having an effect of multiplying the number of pixels can be obtained. That is, an image of higher resolution can be obtained.

FIGS. 7 to 10 are explanatory views of the present embodiment.

Figure 7:
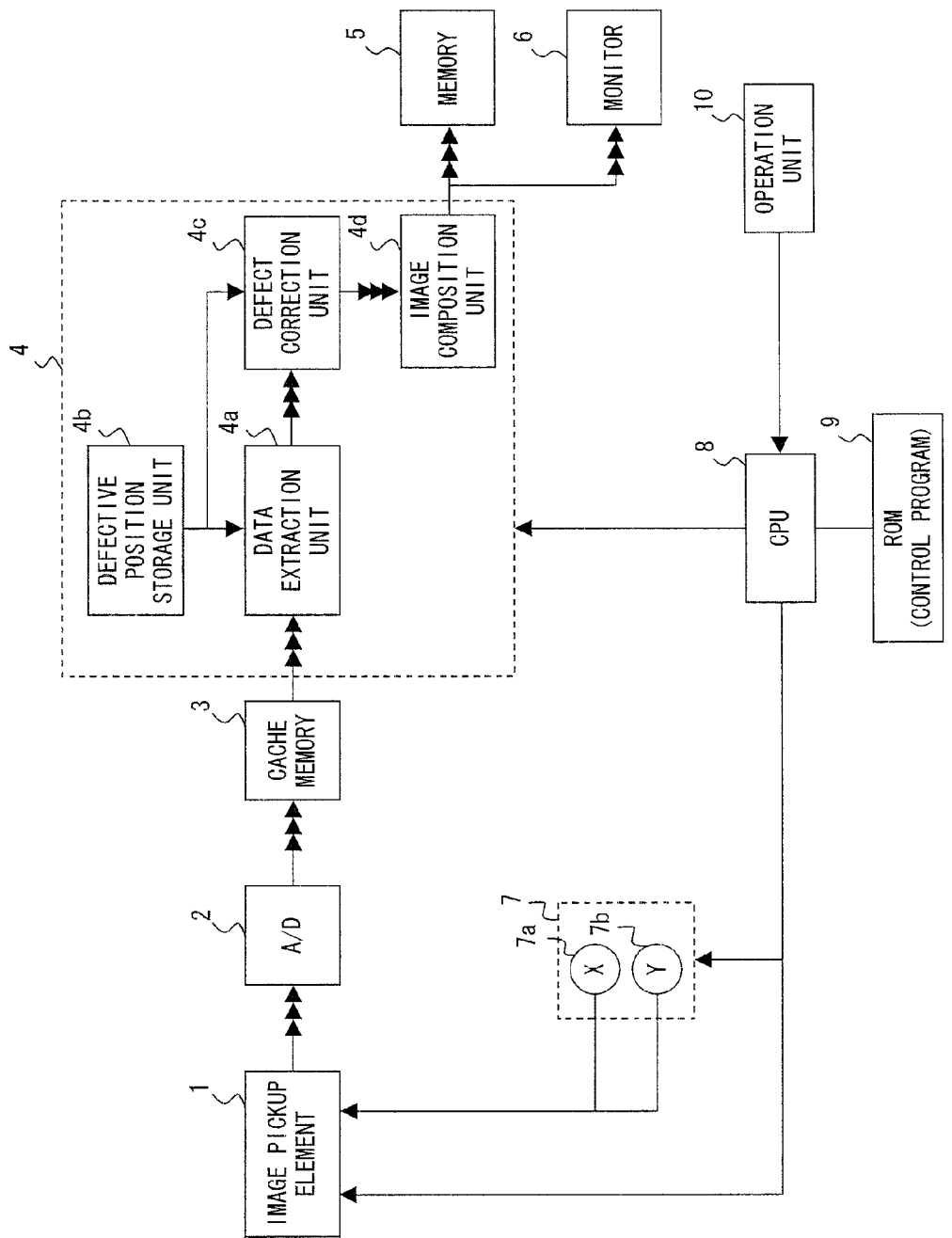
FIG. 7 is a block diagram of the basic configuration of the image pickup apparatus according to an embodiment 2.
Figure 8:
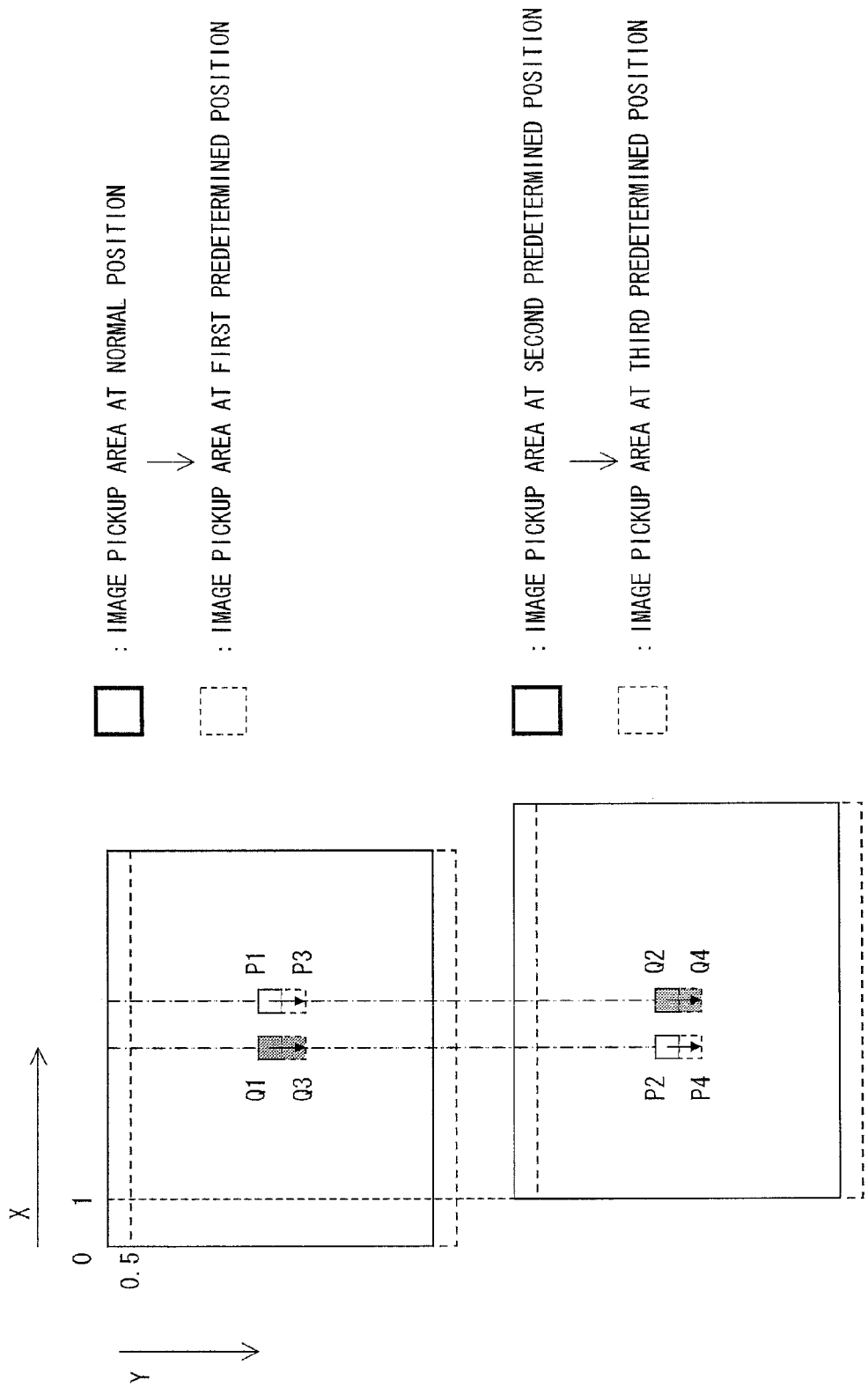
FIG. 8 shows the position of a defective pixel when an image pickup element is moved in the embodiment 2.
Figure 9:
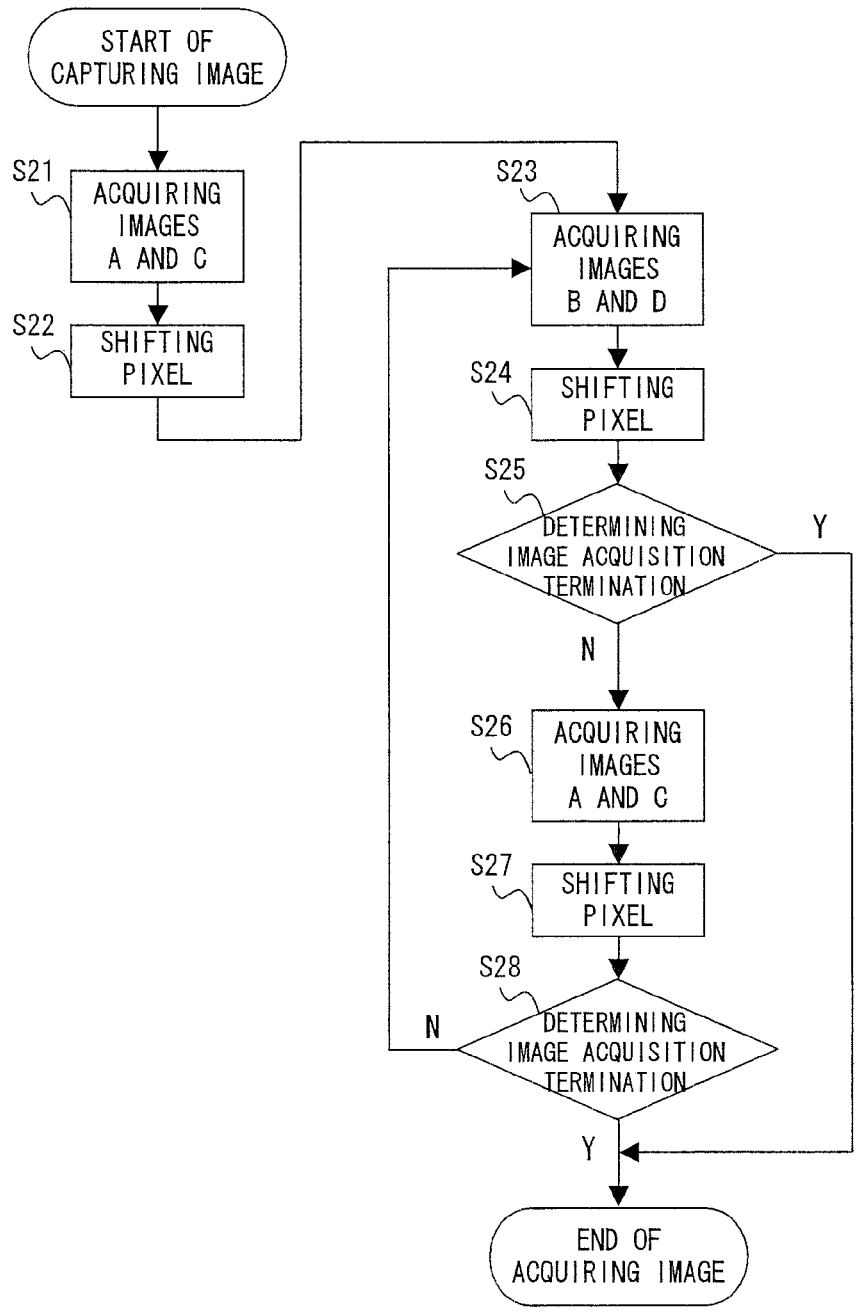
FIG. 9 is a flowchart of the image acquiring process performed during shooting moving pictures by the image pickup apparatus according to the embodiment 2.
Figure 10:
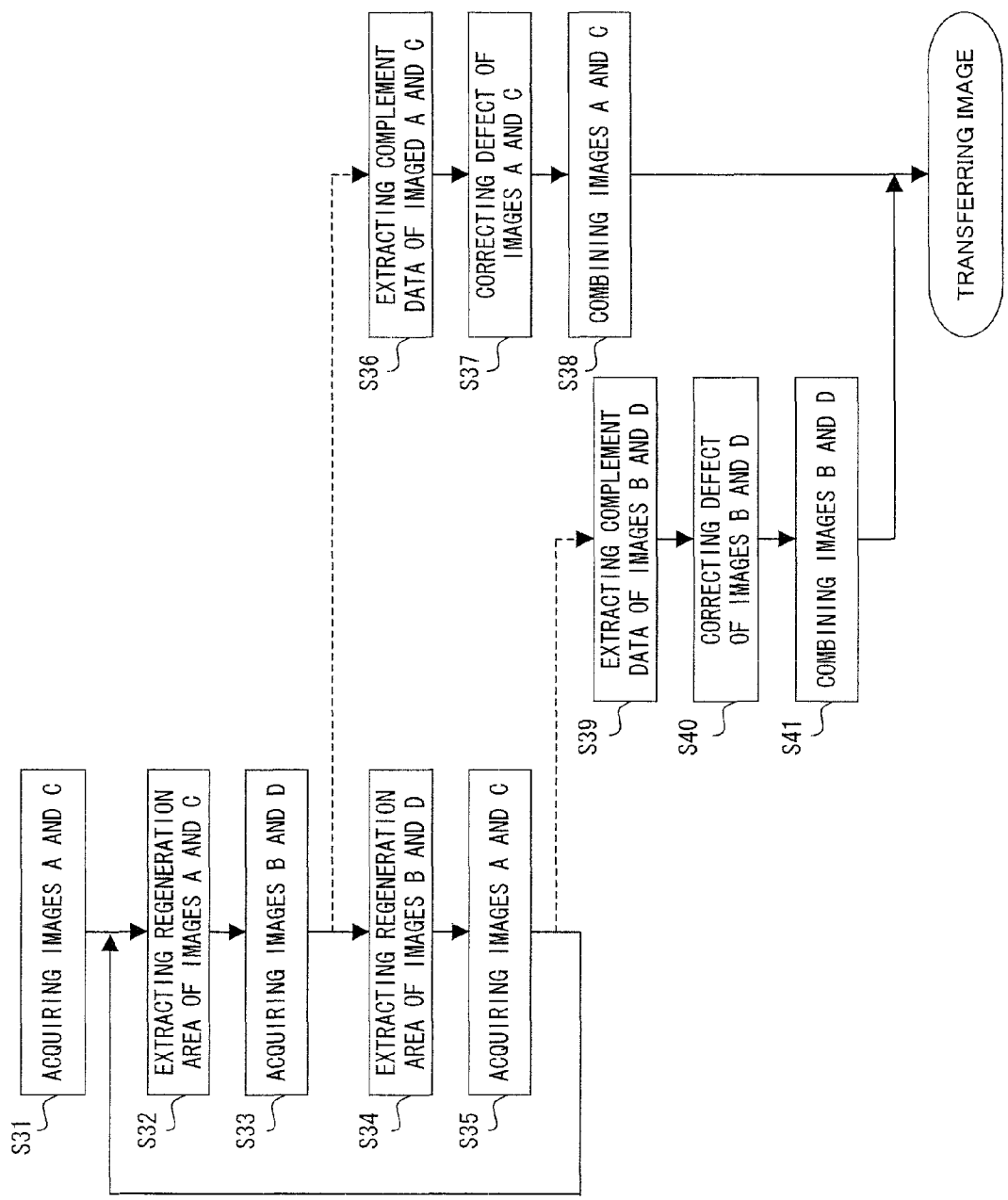
FIG. 10 is a flowchart of the image processing performed during shooting moving pictures according to the embodiment 2.

FIG. 7 is a block diagram of the basic configuration of the image pickup apparatus according to the present embodiment. FIG. 8 shows the position of a defective pixel when an image pickup element is moved. FIG. 9 is a flowchart of the image acquiring process performed during shooting moving pictures by the image pickup apparatus according to the present embodiment. FIG. 10 is a flowchart of the image processing performed during shooting moving pictures.

First, the main configuration of the image pickup apparatus according to the present embodiment is explained below by referring to FIG. 7. In FIG. 7, the same components as in FIG. 1 are assigned the same reference numerals.

As shown in FIG. 7, the different point from the configuration of the image pickup apparatus shown in FIG. 1 is that the signal processing unit 4 includes an image composition unit 4d further. The image composition unit 4d is provided among the defect correction unit 4c, the memory 5, and the monitor 6, combines a plurality of images corrected by the defect correction unit 4c, and forms a large image (composite image). The composite image is stored as one frame in the memory 5 or output to the monitor 6.

Next, the operation performed by the image pickup apparatus with the above-mentioned configuration during shooting moving pictures is explained below.

In this apparatus, the image pickup element 1 sequentially moves among the normal position, the first predetermined position, the second predetermined position, and the third predetermined position, and sequentially repeats the acquisition of an image at each position. In the present embodiment, the predetermined positions can be: the first predetermined position obtained by moving the image pickup element 1 by 0.5 pixel in the +Y direction from the normal position; the second predetermined position obtained by moving the image pickup element 1 by 1 pixel in the +X direction from the normal position; and the third predetermined position obtained by moving the image pickup element 1 by 1 pixel in the +X direction and by 0.5 pixel in the +Y direction from the normal position. The second predetermined position is the same as the predetermined position explained by referring to the embodiment 1.

First, by referring to FIG. 8, the acquisition of an image as described above is explained below in detail. Also in the present embodiment, the overlap in the image pickup area at each position of the image pickup element 1 is defined as a moving picture regeneration area.

FIG. 8 shows the image pickup areas on the image pickup element at the normal position and the first predetermined position, and the image pickup areas on the image pickup element on the image pickup area at the second and third predetermined positions with the positions in the X direction associated with each other.

In FIG. 8, the upper area encompassed by the solid lines indicates the image pickup area of the image pickup element 1 at the normal position. The upper area encompassed by the dotted lines indicates the image pickup area of the image pickup element 1 at the first predetermined position. The lower area encompassed by the solid lines indicates the image pickup area of the image pickup element 1 at the second predetermined position. The lower area encompassed by the dotted lines indicates the image pickup area of the image pickup element 1 at the third predetermined position.

The defective pixel Q1 on the image pickup element at the normal position is moved to the defective pixel Q3 on the image pickup element at the first predetermined position by the movement of the image pickup element 1 to the first predetermined position, to the defective pixel Q2 on the image pickup element at the second predetermined position by the movement of the image pickup element 1 to the second predetermined position, and to the defective pixel Q4 on the image pickup element at the third predetermined position by the movement of the image pickup element 1 to the third predetermined position. The pixel P1 on the image pickup element at the normal position is moved to the pixel P3 on the image pickup element at the first predetermined position by the movement of the image pickup element 1 to the first predetermined position, and the pixel P2 on the image pickup element at the second predetermined position is moved to the pixel P4 on the image pickup element at the third predetermined position by the movement of the image pickup element 1 to the third predetermined position.

Based on the position relationship, the image data of the target to be obtained by the defective pixel Q1 can be obtained by the pixel P2 on the image pickup element at the second predetermined position, the image data of the target to be obtained by the defective pixel Q3 can be obtained by the pixel P4 on the image pickup element at the third predetermined position, the image data of the target to be obtained by the defective pixel Q2 can be obtained by the pixel P1 on the image pickup element at the normal position, and the image data of the target to be obtained by the defective pixel Q4 can be obtained by the pixel P3 on the image pickup element at the first predetermined position.

First, in this operation, as in the embodiment 1, the influence of a defective pixel on an image can be eliminated by complementing the image data of the defective pixel found in the image using the image data of the corresponding pixel of the image acquired at another position, and an image of high resolution can be obtained by combining the complemented images. In more detail, the complemented image at the normal position is combined with the complemented image at the first predetermined position with the positions of a target matching each other to form an image of high resolution. Similarly, the complemented image at the second predetermined position is combined with the complemented image at the third predetermined position with the positions of a target matching each other to form an image of high resolution.

Next, by referring to the flowcharts shown in FIGS. 9 and 10, the operation performed during shooting moving pictures is explained below in detail. In the explanation, for convenience, the image obtained in the image pickup area of the image pickup element 1 at the normal position is defined as an image A, the image obtained in the image pickup area of the image pickup element 1 at the first predetermined position is defined as an image C, the image obtained in the image pickup area of the image pickup element 1 at the second position is defined as an image B, and the image obtained in the image pickup area of the image pickup element 1 at the third position is defined as an image D, First, by referring to FIG. 9, the image acquiring process performed in this operation is explained below in detail.

As shown in FIG. 9, when the shooting process is started in this operation, the CPU 8 transmits a drive timing signal to the image pickup element 1 and the image pickup element drive unit 7, and starts the control of image acquisition at the following predetermined frame rate.

First, the image A is acquired, the acquired image data is stored in the cache memory 3, and then the image pickup element 1 is moved to the first predetermined position, the image C is acquired, the acquired image data is stored in the cache memory 3 (S21).

Then, the image pickup element 1 is moved to the second predetermined position (S22), the image B is acquired, the acquired image data is stored in the cache memory 3, and then the image pickup element 1 is moved to the third predetermined position, the image D is acquired, the acquired image data is stored in the cache memory 3 (S23).

Next, the image pickup element 1 is moved to the normal position (S24).

Then, it is determined whether or not the CPU 8 has accepted an image acquisition termination request from the operation unit 10 (S25). If the determination result is YES, it is determined that the image acquisition has terminated, thereby terminating the image acquiring process.

When the determination in S25 is NO, the image acquisition is continued, the same processes as in S21 and S22 are performed in S26 and S27. In S28, the process similar to that in S25 is performed. When the determination in S28 is NO, control is returned to S23. If it is YES, the image acquiring process is terminated.

Thus, in this operation, the image acquisition is sequentially repeated by the image pickup element 1 at the normal position, the first predetermined position, the second predetermined position, and the third predetermined position until the image acquisition termination request is accepted.

Then, by referring to FIG. 10, the image processing performed in this operation is explained in detail.

As shown in FIG. 10, when the image data of the images A and C are stored in the cache memory 3 in the process in S21 shown in FIG. 9, the data extraction unit 4a acquires the image data of the images A and C from the cache memory 3 (S31), and a moving picture regeneration area is extracted from each of the image data of the images A and C (S32).

Then, the data extraction unit 4a acquires from the cache memory 3 the image data (for example, the image data of the images B and D stored in the cache memory 3 in the process in S23 shown in FIG. 9) of the images B and D stored in the cache memory 3 after the image data of the images A and C acquired in S31 (S33).

Next, a moving picture regeneration area is similarly extracted from the image data of the images B and D (S34), and the image data of the corresponding pixel (refer to pixels P2 and P4 shown in FIG. 8) of the images B and D acquired in S33 is extracted as the complement data of the defective pixel position (refer to the defective pixels Q1 and Q3 shown in FIG. 8) of the images A and C extracted in S32 by referring to the position data of the pixel defect stored in the defective position storage unit 4b (S36). After S36, the defect correction unit 4c corrects the defect of the images A and C by complementing the image data of the defective pixel of the images A and C extracted in S32 using the complement data extracted in S36 (S37). Then, the image composition unit 4d combines the corrected images A and C (S38). The formed composite image is transferred to the memory 5.

On the other hand, the data extraction unit 4a separately continues the process. After S34, the data extraction unit 4a acquires from the cache memory 3 the image data of the images A and C stored in the cache memory 3 after the image data of the images B and D acquired in S33 (S35). Then, the image data of the corresponding pixel (refer to pixels P1 and P3 shown in FIG. 8) of the images A and C acquired in S35 is extracted as the complement data of the defective pixel position (refer to the defective pixels Q2 and Q4 shown in FIG. 8) of the images B and D extracted in S34 by referring to the position data of the pixel defect stored in the defective position storage unit 4b (S39). After S39, the defect correction unit 4c corrects the defect of the images B and D by complementing the image data of the defective pixel of the images B and D extracted in S34 using the complement data extracted in S39 (S40). Then, the image composition unit 4d combines the corrected images B and D (S41). The formed composite image is transferred to the memory 5.

The process by the data extraction unit 4a is separately continued. After S35, control is returned to S32, and the above-mentioned processes are repeated until there is no image data acquired from the cache memory 9 in S33 or S35. Thus, the composite image of the corrected images A and C and the composite image of the corrected images B and D are alternately and continuously transferred to the memory 5, and the moving pictures are formed.

Thus, by performing the image processing, a generated pixel defect can be corrected in the method similar to the embodiment 1 on the composite image (the composite image of the images A and C and the composite image of the images B and D) attained high resolution by shifting a pixel. Thus, in this case, moving pictures appropriately complemented a pixel defect can be formed with the frame rate maintained.

As described above, according to the present embodiment, when shooting moving pictures while attaining high resolution by shifting a pixel, an image can be acquired with a small influence of a pixel defect.

In the present embodiment, the method of shifting a pixel for combining two images is applied, but other pixel shifting methods of combining four or nine images etc. can also be applied.

Embodiments 3

The present embodiment has a further function of optimally determining the image pickup element drive direction (image pickup element moving direction) for correcting a defect in addition to the functions of the embodiments 1 and 2.

Figure 11:
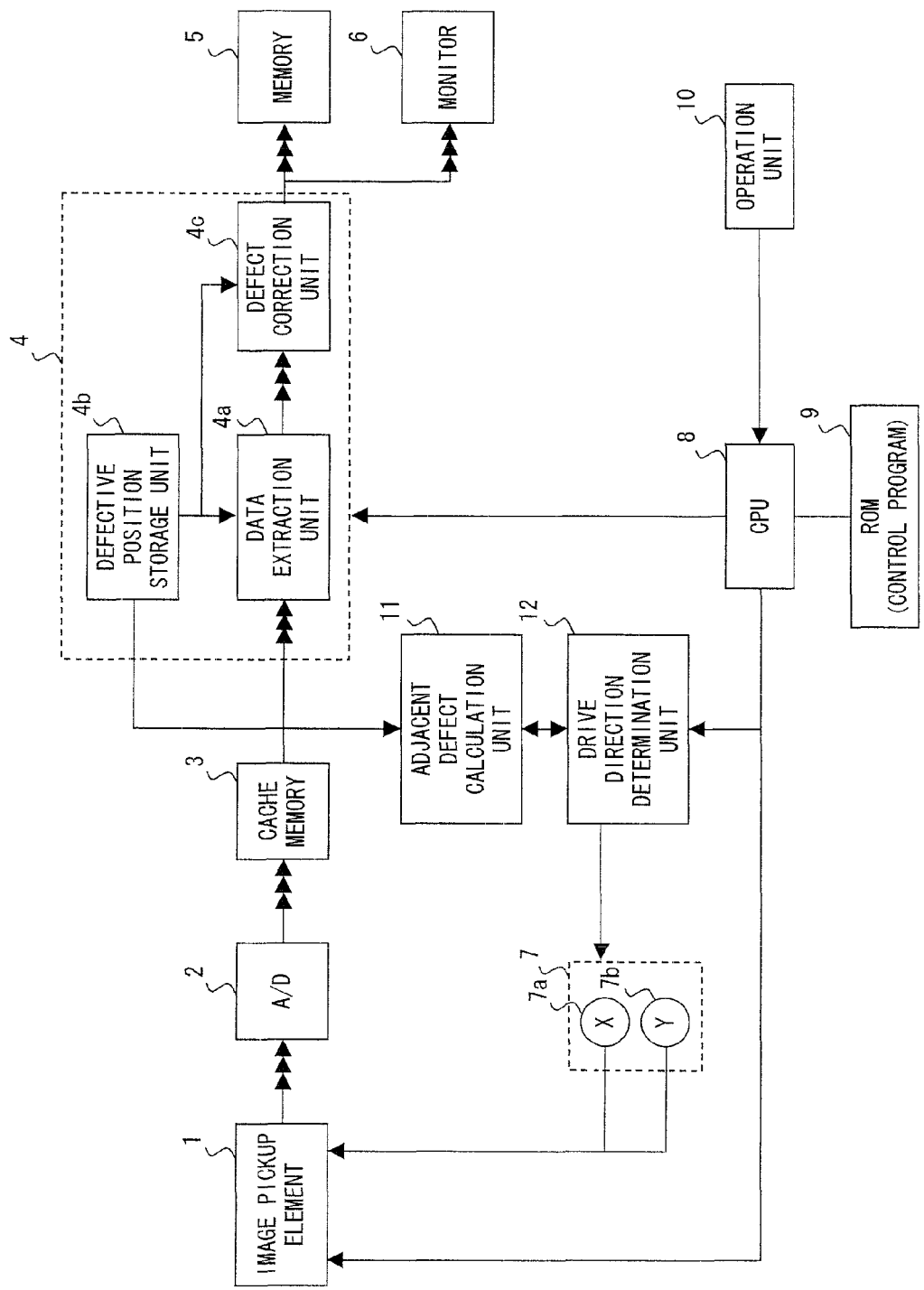
FIG. 11 is a block diagram of the basic configuration of the image pickup apparatus according to an embodiment 3.
Figure 12:
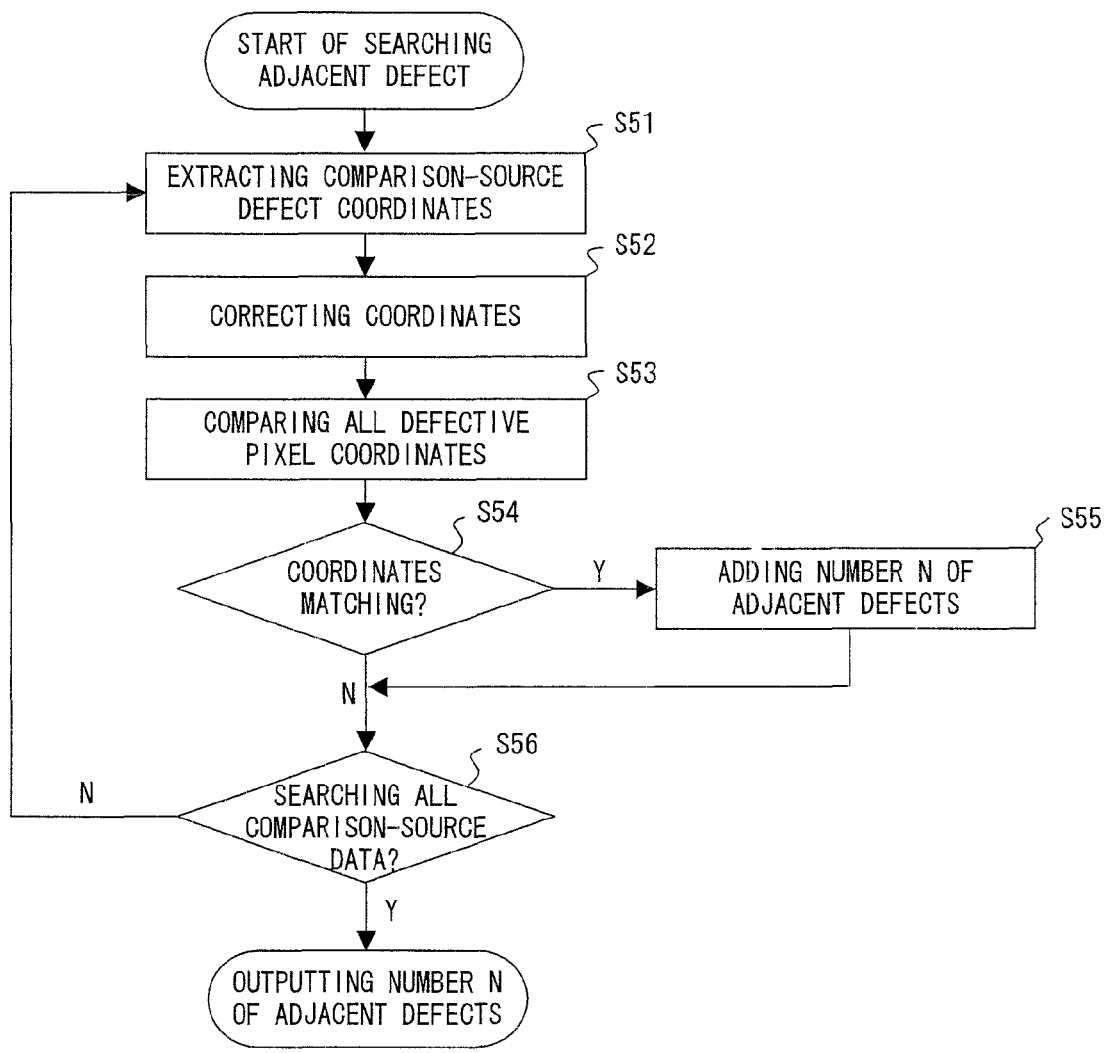
FIG. 12 is a flowchart of the process of determining the optimum drive direction of an image pickup element performed by the image pickup apparatus according to the embodiment 3.
Figure 13:
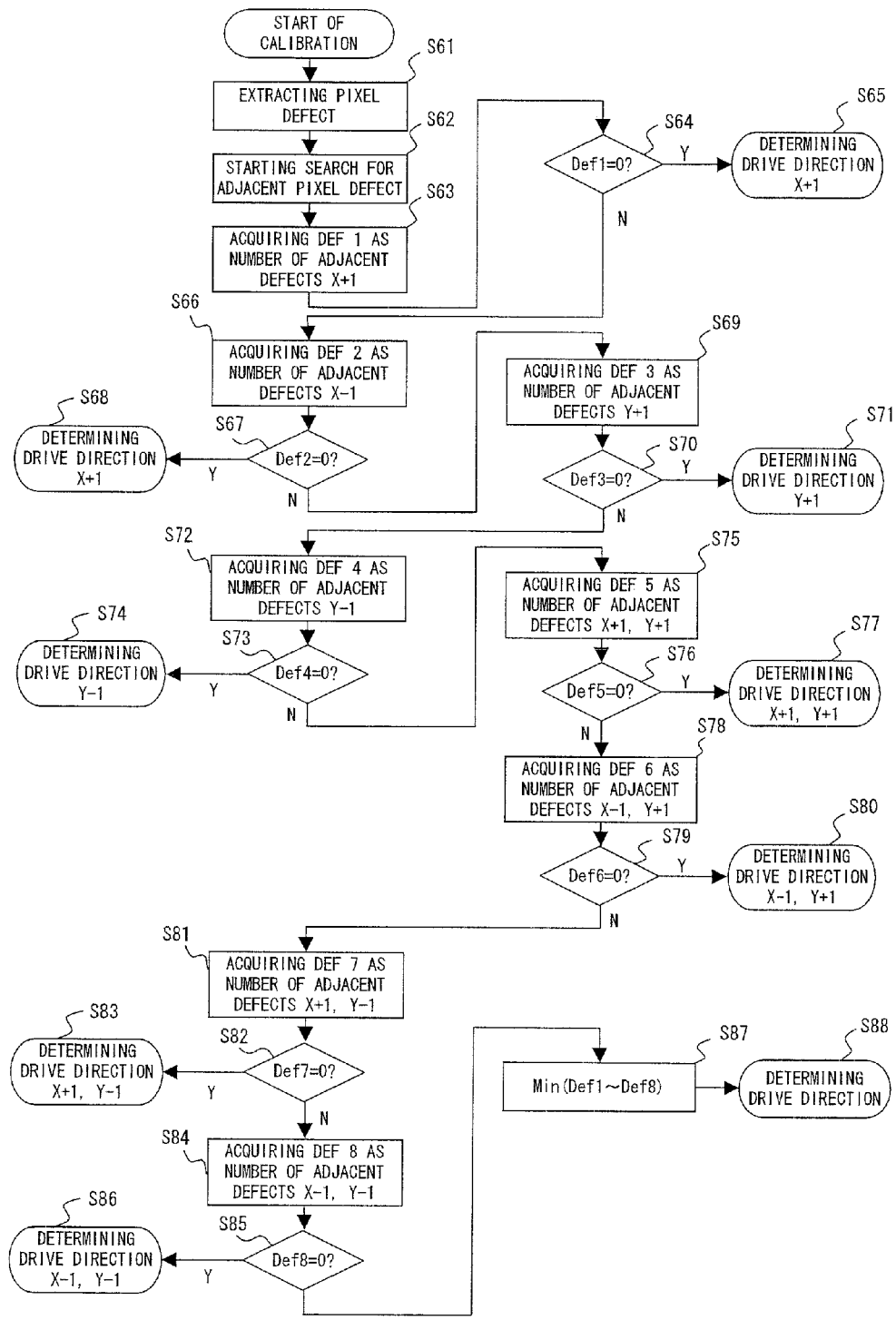
FIG. 13 is a flowchart of the process of determining the optimum drive direction of an image pickup element performed by the image pickup apparatus according to the embodiment 3.

FIGS. 11 through 13 are used in explaining the present embodiment.

FIG. 11 is a block diagram of the basic configuration of the image pickup apparatus according to the present embodiment. FIGS. 12 and 13 are flowcharts of the process of determining the optimum drive direction of the image pickup element.

First, by referring to FIG. 11, the main configuration of the image pickup apparatus according to the present embodiment is explained. In FIG. 11, the same component shown in FIG. 1 is assigned the same reference numeral.

As shown in FIG. 11, the different point from the configuration of the image pickup apparatus shown in FIG. 1 is that an adjacent defect calculation unit 11 and a drive direction determination unit 12 are newly added. The adjacent defect calculation unit 11 counts the number of defective pixels (number of adjacent defective pixel) adjacent to each defective pixel from the position data of the pixel defect stored in the defective position storage unit 4b. The drive direction determination unit 12 compares the number of adjacent pixel defects obtained by the adjacent defect calculation unit 11, and determines the drive direction in which the image pickup element 1 is moved to correct a defect in the direction of minimizing the number of adjacent pixel defects. The determined drive direction is the direction when the image pickup element 1 is driven from the normal position. For example, the direction in the case of the embodiment 1 is to drive the image pickup element 1 from the normal position to the predetermined position, and the direction in the case of the embodiment 2 is to drive the image pickup element 1 from the normal position to the second predetermined position.

The process of counting the number of adjacent pixel defects by the adjacent defect calculation unit 11 is explained in detail by referring to the flowchart shown in FIG. 12.

As shown in FIG. 12, when the search for an adjacent pixel defect is started by the adjacent defect calculation unit 11, the position data (comparison-source defect coordinates) of one pixel defect is extracted from the position data {A1~An} of n pixel defects stored in the defective position storage unit 4b (S51). For example, assume that A1 (a, b) has been extracted as the comparison-source defect coordinates.

Then, the coordinates of A1 are shifted in the direction of searching an adjacent pixel defect (S52). For example, assume that it is one pixel shifted in the +X direction, the shifted coordinates are A1' (a+1, b).

Then, the position data {A1~An} of all pixel defects stored in the defective position storage unit 4b are compared with the A1' (S53), and it is determined whether or not there is the position data matching A1' (S54). If there is the position data matching A1' (YES in S54), the number N of adjacent pixel defects is increased by one (S55), and control is passed to S56. N is cleared before starting the process of this flowchart (N=0). If there is no position data matching A1' (NO in S54), control is passed to S56 as is.

In S56, it is determined whether or not a comparison has made on the position data {A1~An} of all pixel defects as the comparison-source defect coordinates. If the comparison has not been made (NO in S56), control is returned to S51, and the processes in S51 through S56 are similarly repeated on one (for example, A2) of the position data of the remaining pixel defects not extracted as the comparison-source defect coordinates. Thus, when the process terminates on the position data {A1 through An} of all pixel defects as the comparison-source defect coordinates (YES in S56), the number N of adjacent pixel defects is output at this time.

In the above-mentioned process, the number N of adjacent pixel defects can be obtained in the direction of searching for an adjacent pixel defect.

Next, the process of determining the optimum drive direction of the image pickup element 1 by the drive direction determination unit 12 is explained in detail using the flowchart shown in FIG. 13. The flowchart shown in FIG. 13 shows the case in which this process is performed at the calibration of a camera.

As shown in FIG. 13, when the calibration of a camera is started, the pixel defect of the image pickup element 1 is detected (S61), and the position data of the pixel defect is stored in the defective position storage unit 4b.

Then, the search for an adjacent pixel defect is started (S62).

First, the process shown in FIG. 12 is performed with the direction of searching for an adjacent pixel defect and the amount of shift of the coordinates in S52 defined as +X direction by one pixel (X+1). The number N of adjacent pixel defects in this case is acquired as Def 1 (S63). Then, it is determined whether or not Def 1=0 (S64). If Def 1=0 (YES in S64), the drive direction of the image pickup element 1 for a defect correction and the amount of drive are determined as +X direction by one pixel (S65).

If Def 1≠0 (NO in S64), then the process shown in FIG. 12 is performed with the direction of searching for an adjacent pixel defect and the amount of shift of the coordinates in S52 defined as −X direction by one pixel (X−1), and the number N of adjacent pixel defects is acquired as Def 2 (S66). Then, it is determined whether or not Def 2=0 (S67). If Def 2=0 (YES in S67), then the drive direction of the image pickup element 1 and the amount of drive are determined as −X direction by one pixel (S68).

If Def 2≠0 (NO in S67), then the process shown in FIG. 12 is performed with the direction of searching for an adjacent pixel defect and the amount of shift of the coordinates in S52 defined as +Y direction by one pixel (Y+1), and the number N of adjacent pixel defects is acquired as Def 3 (S69). Then, it is determined whether or not Def 3=0 (S70). If Def 3=0 (YES in S70), then the drive direction of the image pickup element 1 and the amount of drive are determined as +Y direction by one pixel (S71).

If Def 3≠0 (NO in S70), then the process shown in FIG. 12 is performed with the direction of searching for an adjacent pixel defect and the amount of shift of the coordinates in S52 defined as −Y direction by one pixel (Y−1), and the number N of adjacent pixel defects is acquired as Def 4 (S72). Then, it is determined whether or not Def 4=0 (S73). If Def 4=0 (YES in S73), then the drive direction of the image pickup element 1 and the amount of drive are determined as −Y direction by one pixel (S74).

If Def 4≠0 (NO in S73), then the process shown in FIG. 12 is performed with the direction of searching for an adjacent pixel defect and the amount of shift of the coordinates in S52 defined as +X direction by one pixel and +Y direction by one pixel (X+1, Y+1), and the number N of adjacent pixel defects is acquired as Def 5 (S75). Then, it is determined whether or not Def 5=0 (S76). If Def 5=0 (YES in S76), then the drive direction of the image pickup element 1 and the amount of drive are determined as +X direction by one pixel and +Y direction by one pixel (S77).

If Def 5≠0 (NO in S76), then the process shown in FIG. 12 is performed with the direction of searching for an adjacent pixel defect and the amount of shift of the coordinates in S52 defined as −X direction by one pixel and +Y direction by one pixel (X−1, Y+1), and the number N of adjacent pixel defects is acquired as Def 6 (S78). Then, it is determined whether or not Def 6=0 (S79). If Def 6=0 (YES in S79), then the drive direction of the image pickup element 1 and the amount of drive are determined as −X direction by one pixel and +Y direction by one pixel (S80).

If Def 6≠0 (NO in S79), then the process shown in FIG. 12 is performed with the direction of searching for an adjacent pixel defect and the amount of shift of the coordinates in S52 defined as +X direction by one pixel and −Y direction by one pixel (X+1, Y−1), and the number N of adjacent pixel defects is acquired as Def 7 (S81). Then, it is determined whether or not Def 7=0 (S82). If Def 7=0 (YES in S82), then the drive direction of the image pickup element 1 and the amount of drive are determined as +X direction by one pixel and −Y direction by one pixel (S83).

If Def 7≠0 (NO in S82), then the process shown in FIG. 12 is performed with the direction of searching for an adjacent pixel defect and the amount of shift of the coordinates in S52 defined as −X direction by one pixel and −Y direction by one pixel (X−1, Y−1), and the number N of adjacent pixel defects is acquired as Def 8 (S84). Then, it is determined whether or not Def 8=0 (S85). If Def 8=0 (YES in S85), then the drive direction of the image pickup element 1 and the amount of drive are determined as −X direction by one pixel and −Y direction by one pixel (S86).

If Def 8≠0 (NO in S85), then the minimum value of Def 1 through 8 is obtained (S87). When the minimum value is obtained, the direction of searching for the adjacent pixel defect and the amount of shift of the coordinates are determined as the drive direction of the image pickup element 1 and the amount of drive (S88).

In this process, the drive direction of the image pickup element for correcting a defect can be optimally determined.

This process is performed at the calibration of a camera, at the initialization when a camera is shipped at the factory, etc., and the operation performed during shooting moving pictures is the same as in the embodiments 1 and 2.

As described above, according to the present embodiment, the drive direction of an image pickup element can be determined in the direction of no or minimum overlap of a pixel defect independent of an occurrence pattern of a pixel defect. Therefore, the remaining defect after a correction can be minimized without receiving an influence of the variance of the image pickup element.

In the present embodiment, the searching direction when the drive direction of the image pickup element is determined has been determined as right (X+1), left (X−1), down (Y+1), up (Y−1), lower right (X+1, Y+1), lower left (X−1, Y+1), upper right (X+1, Y−1), upper left (X−1, Y−1). However, the present invention is not limited to these applications. For example, considering the reduction of the processing time, four directions (up, down, left, and right) can be defined. Furthermore, the amount of shift of the coordinates is not limited to one pixel, but two or more pixels can be defined. The amount of shift of the coordinates is not limited to one pixel, but a combination of, for example, one and two pixels, etc. can be set. In this case, in addition to the drive direction of the image pickup element, the amount of drive (amount of shift) of the image pickup element can be determined from the mutual position relationship of defective pixels.

The present invention is described above in detail, but it is not limited to the above-mentioned embodiments, but can be improved and varied within the scope of the gist of the present invention.

As described above, according to the present invention, when moving pictures are taken using an image pickup element having a pixel defect, images having very small influence of the pixel defect can be acquired with the frame rate maintained. Therefore, the optimum moving pictures with both appropriate frame rate and image quality maintained without enhancing the production quality of the image pickup element. Furthermore, a user can be provided with an excellent image pickup apparatus in both cost and quality of pictures.

Also when moving pictures are taken with higher resolution by shifting pixels, high-resolution images having a very small influence of a pixel defect can be acquired.

Additionally, regardless of the variance in pixel defect generated in an image pickup element, an image pickup apparatus can be provided with minimized pixel defects in images, thereby steadily providing excellent images for users.

What is claimed is:

1. An image pickup apparatus, comprising:
an image pickup element having a plurality of pixels;
a drive unit moving the image pickup element;
a defective position storage unit storing position data on the image pickup element about a defective pixel contained in the plurality of pixels;
an image extraction unit extracting a moving picture regeneration area depending on a position of the image pickup element during capturing an image from a captured image obtained by the image pickup element; and
a defect correction unit complementing a defective pixel of a captured image obtained by the image pickup element using image data of captured image obtained by the image pickup element in another position,
wherein moving pictures are formed by continuously outputting captured images in the moving picture regeneration area for which the defect correction unit has complemented the defective pixel,
wherein a moving direction and moving amount of the image pickup element for the complement is determined from mutual position relationship of a defective pixel contained in the plurality of pixels, and
wherein the determination of the moving direction and the moving amount includes determining, according to the position data of the defective pixel stored in the position storage unit, a number of defective pixels that are adjacent to the defective pixel in a specific direction and in a specific amount, when the number of defective pixels is "0", determining the specific direction and the specific amount as the moving direction and the moving amount of the image pickup element for the complement, and when the number of defective pixels is not "0", repeating a process of changing at least one of the specific direction and the specific amount for a predetermined number of times or until the specific direction and the specific amount is determined to be the moving direction and the moving amount of the image pickup element for the complement.

2. A non-transitory computer-readable recording medium storing an image pickup program used to direct a computer of an image pickup apparatus to realize:

a driving function for moving an image pickup element comprising a plurality of pixels;
an image extracting function of extracting a moving picture regeneration area depending on a position of the image pickup element during capturing an image from a captured image obtained by the image pickup element;
a defect correcting function of complementing a defective pixel of a captured image obtained by the image pickup element using image data of captured image obtained by the image pickup element in another position based on position data on the image pickup element about a defective pixel contained in the plurality of pixels and stored in a defective position storage unit; and
a function of forming moving pictures by continuously outputting captured images in the moving picture regeneration area for which the defective pixel has been complemented by the defect correcting function,
wherein a moving direction and a moving amount of the image pickup element for the complement is determined from mutual position relationship of a defective pixel contained in the plurality of pixels, and
wherein the determination of the moving direction and the moving amount includes determining, according to the position data of the defective pixel stored in the position storage unit, a number of defective pixels that are adjacent to the defective pixel in a specific direction and in a specific amount, when the number of defective pixels is "0", determining the specific direction and the specific amount as the moving direction and the moving amount of the image pickup element for the complement, and when the number of defective pixels is not "0", repeating a process of changing at least one of the specific direction and the specific amount for a predetermined number of times or until the specific direction and the specific amount is determined to be the moving direction and the moving amount of the image pickup element for the complement.

3. A method for forming moving pictures of an image pickup apparatus constituted to move an image pickup element including a plurality of pixels by continuously performing:

extracting a moving picture regeneration area depending on a position of the image pickup element during capturing an image from a captured image obtained by the image pickup element;
complementing a defective pixel in the extracted moving picture regeneration area using image data of a captured image acquired by the image pickup element in a position other than a position of the image pickup element; and
outputting the captured image in the moving picture regeneration area in which the defective pixel has been complemented,
wherein a moving direction and a moving amount of the image pickup element for the complement is determined from mutual position relationship of a defective pixel contained in the plurality of pixels, and
wherein the determination of the moving direction and the moving amount includes determining, according to the position data of the defective pixel stored in the position storage unit, a number of defective pixels that are adjacent to the defective pixel in a specific direction and in a specific amount, when the number of defective pixels is "0", determining the specific direction and the specific amount as the moving direction and the moving amount of the image pickup element for the complement, and when the number of defective pixels is not "0", repeating a process of changing at least one of the specific direction and the specific amount for a predetermined number of times or until the specific direction and the specific amount is determined to be the moving direction and the moving amount of the image pickup element for the complement.

* * * * *